United States Patent
Flesch (10) Patent No.: US 11,917,420 B2
(45) Date of Patent: Feb. 27, 2024

(54) PROVISIONING AN ACCESS POINT DEVICE USING AN EIRP MASK

(71) Applicant: ARRIS Enterprises LLC, Suwanee, GA (US)

(72) Inventor: James R. Flesch, Doraville, GA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 198 days.

(21) Appl. No.: 17/494,169

(22) Filed: Oct. 5, 2021

(65) Prior Publication Data
US 2022/0141673 A1 May 5, 2022

Related U.S. Application Data (60) Provisional application No. 63/109,610, filed on Nov. 4, 2020.

(51) Int. Cl.
| | |
|---|---|
| *H04W 16/18* | (2009.01) |
| *H04L 5/00* | (2006.01) |
| *H04W 52/24* | (2009.01) |
| *H04W 72/51* | (2023.01) |

(52) U.S. Cl.
CPC .......... *H04W 16/18* (2013.01); *H04L 5/0069* (2013.01); *H04W 52/243* (2013.01); *H04W 72/51* (2023.01)

(58) Field of Classification Search
None
See application file for complete search history.

(56) References Cited

U.S. PATENT DOCUMENTS

| | | | |
|---|---|---|---|
| 2006/0240840 A1 | 10/2006 | Morgan et al. | |
| 2009/0280748 A1* | 11/2009 | Shan | H04W 72/20 455/67.11 |
| 2011/0063167 A1* | 3/2011 | Gum | G01C 21/20 33/355 R |

(Continued)

FOREIGN PATENT DOCUMENTS

WO  2017/132976  8/2017

OTHER PUBLICATIONS

International Search Report and the Written Opinion of the International Searching Authority dated Jan. 10, 2022 in International (PCT) Application No. PCT/US2021/053529.

(Continued)

*Primary Examiner* — Jenkey Van
(74) *Attorney, Agent, or Firm* — Wenderoth, Lind & Ponack, L.L.P.

(57) ABSTRACT

An enhanced network environment is provided by provisioning a device to utilize the 6 GHz frequency band. The device requires provisioning so as not to interfere with legacy systems. The provisioning requires that the two-dimensional location of the device be obtained and sent to a topographical mapping network resource to obtain an accurate ground location for the terrain. The elevation is then modified based on an actual height from ground level of the device. The location of the device can then be sent to an automated frequency controller (AFC) resource to obtain an equivalent isotropically radiated power mask that can be used to provision the device so that the device can operate in the 6 GHz frequency band without causing interference with any other systems. Once provisioned, the device can be registered with the AFC resource.

20 Claims, 5 Drawing Sheets

(56) References Cited

U.S. PATENT DOCUMENTS

| | | |
|---|---|---|
| 2017/0188377 A1 | 6/2017 | Reis et al. |
| 2019/0124584 A1 | 4/2019 | Parikh et al. |
| 2019/0368892 A1* | 12/2019 | Cook ...................... G01P 15/14 |
| 2020/0202729 A1 | 6/2020 | Tam et al. |
| 2021/0282025 A1* | 9/2021 | Bandyopadhyay ... H04W 36/24 |
| 2021/0389474 A1* | 12/2021 | Hamzeh ............. H04B 7/18517 |
| 2022/0338017 A1* | 10/2022 | Cimpu .................. H04W 16/28 |

OTHER PUBLICATIONS

International Preliminary Report on Patentability and Written Opinion dated May 19, 2023 in International Application No. PCT/US2021/053529.

* cited by examiner

PROVISIONING AN ACCESS POINT DEVICE USING AN EIRP MASK

BACKGROUND

Companies are increasingly providing Multiple Access Point (MAP) architecture or Home Network Controller (HNC) type of home wireless fidelity (Wi-Fi) management, with multiple access point devices and/or extender access point devices (collectively, network devices) within the home to improve Quality of Experience (QoE) of the user by offering extended coverage with seamless roaming. Access point devices and extender access point devices communicate with client devices using one or more RF channels. Typically, 5 GigaHertz (GHz) radio is used for Wi-Fi backhaul in extender access point devices because such offers more bandwidth with less interference and greater reliability when compared to 2.4 GHz radio. However, network architecture and user demands are creating a crowded space even for the 5 GHz frequency band. Even in the network environments where relatively high bitrate streaming traffic is shunted off of the 2.4 GHz frequency band to the 5 GHz frequency band, crowding in both pieces of the spectrum is becoming everyday more commonplace.

The 6 GHz frequency band is providing some relief for the overcrowding of the 2.4 GHz and 5 GHz frequency bands. However, legacy 6 GHz wireless infrastructures or systems, such as a fixed microwave system, may be located within a proximity of a network device. The network device is not permitted to operate using a channel that interferes with the legacy 6 GHz wireless infrastructures. Therefore, there is a need to provide an enhanced Wi-Fi network experience for users, especially indoor Wi-Fi network users, by provisioning the network device to use the 6 GHz frequency band without interfering with any legacy 6 GHz wireless infrastructures or systems.

SUMMARY

Network environments, especially home network environments, can now serve multiple functions for various types of users and network devices. For example, the same network can be required to support a variety of users that require differing amounts of access and bandwidth and multiple networks. Given the various network activities that include substantial reliance on Internet access, especially indoor Wi-Fi or Internet access, and increased access to network resources, it is becoming imperative to provide the best optimized access to the network for all users and/or network devices seeking access to any number of network resources. A 6 GHz frequency band network can provide users of the network environment an option for a less crowded network and can enhance the QoE of the users.

One or more novel solutions of the present disclosure provide a Wi-Fi network utilizing the next generation of Wi-Fi technology, Wi-Fi 6. For example, the present disclosure provides for accounting for a radio frequency interference (RFI)/co-channel interference (CCI) to an adjacent 6 GHz fixed wireless infrastructure by indoor IEEE 802.11 6 GHz access point devices using an application-based site survey and data exchanges with network resources (such as cloud-hosted databases). To ensure that a network device, such as an access point device, does not interfere with a legacy 6 GHz infrastructure or system, the coordinate location of the network device must be determined. This coordinate location must include not only the x-y plane coordinates but also the z-plane coordinate. By using the location coordinates and equivalent isotropically radiated power (EIRP) associated with the access point device along with a height location provided, for example, by the user, a virtualized location can be determined. This virtualized location can be used by a provisioning application with access to an automated frequency coordination (AFC) resource or agent to calculate or determine the exposure to existing 6 GHz frequency band infrastructure and recommends an EIRP mask for provisioning the access point device. The provisioning application can use this information received from the AFC resource to provision the access point device to operate using the 6 GHz frequency band without interfering with any other network systems, such as legacy infrastructures or systems operating within the same frequency band.

An aspect of the present disclosure provides a method for provisioning an access point device using an equivalent isotropically radiated power (EIRP) mask. The method comprises determining that an accelerometer and a magnetometer of a mobile network device are calibrated, performing a query of a global positioning system (GPS) receiver of the mobile network device for a GPS fix, sampling, until the GPS fix is obtained, from the magnetometer and the accelerometer to obtain sensor data, wherein the sensor data comprises a magnetic direction associated with each sampling of the magnetometer and a plurality of coordinates for each sampling of the accelerometer, wherein the GPS fix is based the sensor data, determining a height measurement associated with the access point device, determining a virtual location of the access point device based on the height measurement and the GPS fix, transmitting the virtual location to an automated frequency coordination (AFC) resource, receiving the EIRP mask from the AFC resource, and provisioning the access point device based the EIRP mask.

In an aspect of the present disclosure, the method further comprises determining a magnetometer declination associated with the magnetometer and normalizing the sensor data based on the magnetometer declination.

In an aspect of the present disclosure, the method further comprises performing a double integration of the normalized sensor data, determining an azimuth at radius offset for the access point device based on the double integration and modifying the virtual location based on the azimuth at radius offset.

In an aspect of the present disclosure, the method further comprises transmitting the virtual location to a topographical resource, receiving from the topographical resource a z-coordinate, and modifying the virtual location based on the z-coordinate, wherein the virtual location transmitted to the AFC resource is the modified virtual location.

In an aspect of the present disclosure, further comprising prompting a user to calibrate the mobile network device and prompting the user to transition the mobile network device until the GPS fix is obtained.

In an aspect of the present disclosure, the method further comprises prompting a user to confirm the virtual location of the access point device.

In an aspect of the present disclosure, the method further comprises reporting a confirmation to the AFC system of the provisioning of the access point device.

An aspect of the present disclosure provides a provisioning system stored in a non-transitory computer-readable medium for providing an access point device using an equivalent isotropically radiated power (EIRP) mask. The provisioning system comprises a calibration module that determines a calibration of an accelerometer and a magnetometer associated with a mobile network device. The provisioning system also comprises a location determination module that performs a query of a global positioning system (GPS) receiver of the mobile network device for a GPS fix, samples, until the GPS fix is obtained, the magnetometer and the accelerometer to obtain sensor data, wherein the sensor data comprises a magnetic direction associated with each sampling of the magnetometer and a plurality of coordinates for each sampling of the accelerometer, determines a height measurement associated with the access point device, and determines a virtual location of the access point device based on the height measurement and the GPS fix. The provisioning system also comprises an EIRP mask generation module that transmits the virtual location to an automated frequency coordination (AFC) resource and receives the EIRP mask from the AFC resource. The provisioning system also comprises a provisioning module that provisions the access point device based on the EIRP mask.

In an aspect of the present disclosure, the location determination module further determines a magnetometer declination associated with the magnetometer and normalizes the sensor data based on the magnetometer declination.

In an aspect of the present disclosure, the location determination module further performs a double integration of the normalized sensor data, wherein the offset is based on the double integration, determines an azimuth at radius offset for the access point device based on the double integration and modifies the virtual location based on the azimuth at radius offset.

In an aspect of the present disclosure, the location determination module further transmits the virtual location to a topographical resource, receives from the topographical resource a z-coordinate, and modifies the virtual location based on the z-coordinate, wherein the virtual location transmitted to the AFC resource is the modified virtual location.

In an aspect of the present disclosure, the provisioning system further comprises a user interface system that prompts a user to calibrate the mobile network device and prompts the user to transition the mobile network device until the GPS fix is obtained.

In an aspect of the present disclosure, the provisioning system further comprises a user interface system that prompts a user to confirm the virtual location of the access point device.

In an aspect of the present disclosure, the provisioning module further reports a confirmation to the AFC resource of the provisioning of the access point device.

An aspect of the present disclosure provides a non-transitory computer-readable medium for storing one or more instructions for provisioning an access point device of a network using an EIRP mask. The one or more instructions, that when executed by a processor, cause the processor to perform one or more operations including the steps of the methods described above.

The above-described network device(s) or electronic apparatus(es), such as access point devices, extender access point devices, client devices and any other network devices, may be implemented as any of a residential network access point device, an electronic device (for example, a mobile phone, a computing device such as a notebook computer, or both) according to some example embodiments.

Thus, according to various aspects of the present disclosure described herein, it is possible to provision an access point device to utilize the 6 GHz frequency band of a network without interfering with legacy systems within proximity of the access point device. The provisioning is based on an EIRP mask that is received from a network resource after virtual coordinates are obtained that accurately identify a location of the access point device.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
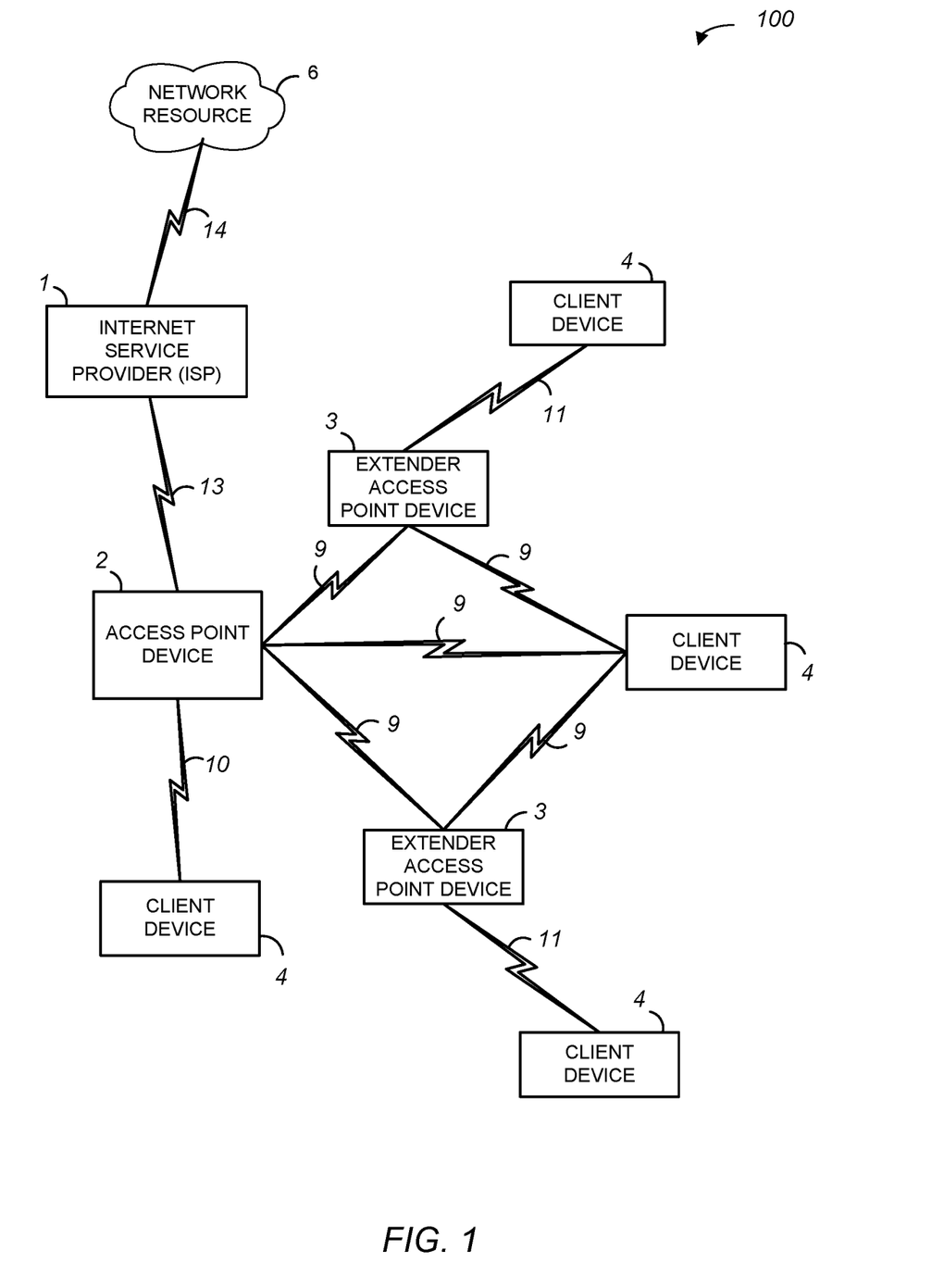
FIG. 1 is a schematic diagram of a network environment, according to one or more aspects of the present disclosure.

FIG. 1 is a schematic diagram of a network environment 100, according to one or more aspects of the present disclosure.

It should be appreciated that various example embodiments of inventive concepts disclosed herein are not limited to specific numbers or combinations of devices, and there may be one or multiple of some of the aforementioned electronic apparatuses or network devices in the network environment, which may itself consist of multiple communication networks and various known or future developed wireless connectivity technologies, protocols, devices, and the like.

As shown in FIG. 1, the main elements of the network environment 100 include a network comprising an access point device 2 connected to a network resource 6, such as a cloud-based repository, via an Internet Service Provider (ISP) 1 and also connected to different wireless devices or network devices such as one or more wireless extender access point devices 3 and one or more client devices 4. The network environment 100 shown in FIG. 1 includes wired and/or wireless network devices (e.g., extender access point devices 3 and client devices 4) that may be connected in one or more wireless networks (e.g., private, guest, iControl, backhaul network, or Internet of things (IoT) network) within the network environment 100. Additionally, there could be some overlap between network devices (e.g., extender access point devices 3 and client devices 4) in the different networks. That is, one or more network or wireless devices could be located in more than one network. For example, the extender access point devices 3 could be located both in a private network for providing content and information to a client device 4 and also included in a backhaul network or an iControl network.

The ISP 1 can be, for example, a content provider or any computer for connecting the access point device 2 to the network resource 6. For example, network resource 6 can be a cloud-based service that provides access to a cloud-based repository, a governmental or other database that provides information associated with operations within the 6 GHz wireless frequency band, a location service for providing topographical information, for example, topographical information associated with a coordinate, such as a z-coordinate associated with a location indicated by an x-y coordinate, a network resource that provides an EIRP mask, any other repository, or any combination thereof that is accessible via ISP 1. In one or more embodiments, network resource 6 may be accessible via a cellular communications service provider. The connection 14 between the network resource 6 and the ISP 1 and the connection 13 between the ISP 1 and the access point device 2 can be implemented using a wide area network (WAN), a virtual private network (VPN), metropolitan area networks (MANs), system area networks (SANs), a data over cable service interface specification (DOCSIS) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The access point device 2 can be, for example, an access point and/or a hardware electronic device that may be a combination modem and gateway that combines the functions of a modem, an access point (AP), and/or a router for providing content received from the ISP 1 to one or more network devices (e.g., wireless extender access point devices 3 and client devices 4) in the network environment 100. In one or more embodiments, the access point device 2 is provisioned based on an EIRP mask so as to provide a 6 GHz wireless frequency band network for one or more network devices connected to the access point device 2. It is also contemplated by the present disclosure that the access point device 2 can include the function of, but is not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP).

The connection 9 between the access point device 2, the wireless extender access point devices 3, and client devices 4 can be implemented using a wireless connection in accordance with any IEEE 802.11 Wi-Fi protocols, Bluetooth protocols, BLE, or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information on any of one or more channels that are available for use.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, client devices 4, which may be out of range of the access point device 2. The extender access point devices 3 can also receive signals from the client devices 4 and rebroadcast the signals to the access point device 2, or other client devices 4.

The connection 11 between the extender access point devices 3 and the client devices 4 are implemented through a wireless connection that operates in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection. Any one or more connections 11 can carry information on any one or more channels that are available for use.

The client devices 4 can be, for example, hand-held computing devices, personal computers, electronic tablets, mobile phones, smart phones, smart speakers, Internet-of-Things (IoT) devices, iControl devices, portable music players with smart capabilities capable of connecting to the Internet, cellular networks, and interconnecting with other devices via Wi-Fi and Bluetooth, or other wireless hand-held consumer electronic devices capable of accessing a wireless network. For example, any one or more client devices can be a mobile network device capable of connecting to a wireless network and provisioning the access point device 2 to provide a 6 GHz wireless frequency band network. Additionally, any one or more client devices 4 can be a television (TV), an IP/QAM set-top box (STB) or a streaming media decoder that is capable of decoding audio/video content, and playing over OTT or MSO provided content received through the access point device 2. In one or more embodiments, a client device 4 is a network device associated with a user for determining an EIRP mask and provisioning the access point device 2 based on the EIRP mask.

The connection 10 between the access point device 2 and the client device 4 is implemented through a wireless connection that operates in accordance with, but is not limited to, any IEEE 802.11 protocols. Additionally, the connection 10 between the access point device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G, or 6G network, for example. In one or more embodiments, after a client device 4 has provisioned the access point device 2 based on an EIRP mask, the client device 4 connects to a 6 GHz wireless frequency band network of the provisioned access point device 2.

The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. One or more of the connections 10 can also be a wired Ethernet connection.

Figure 2:
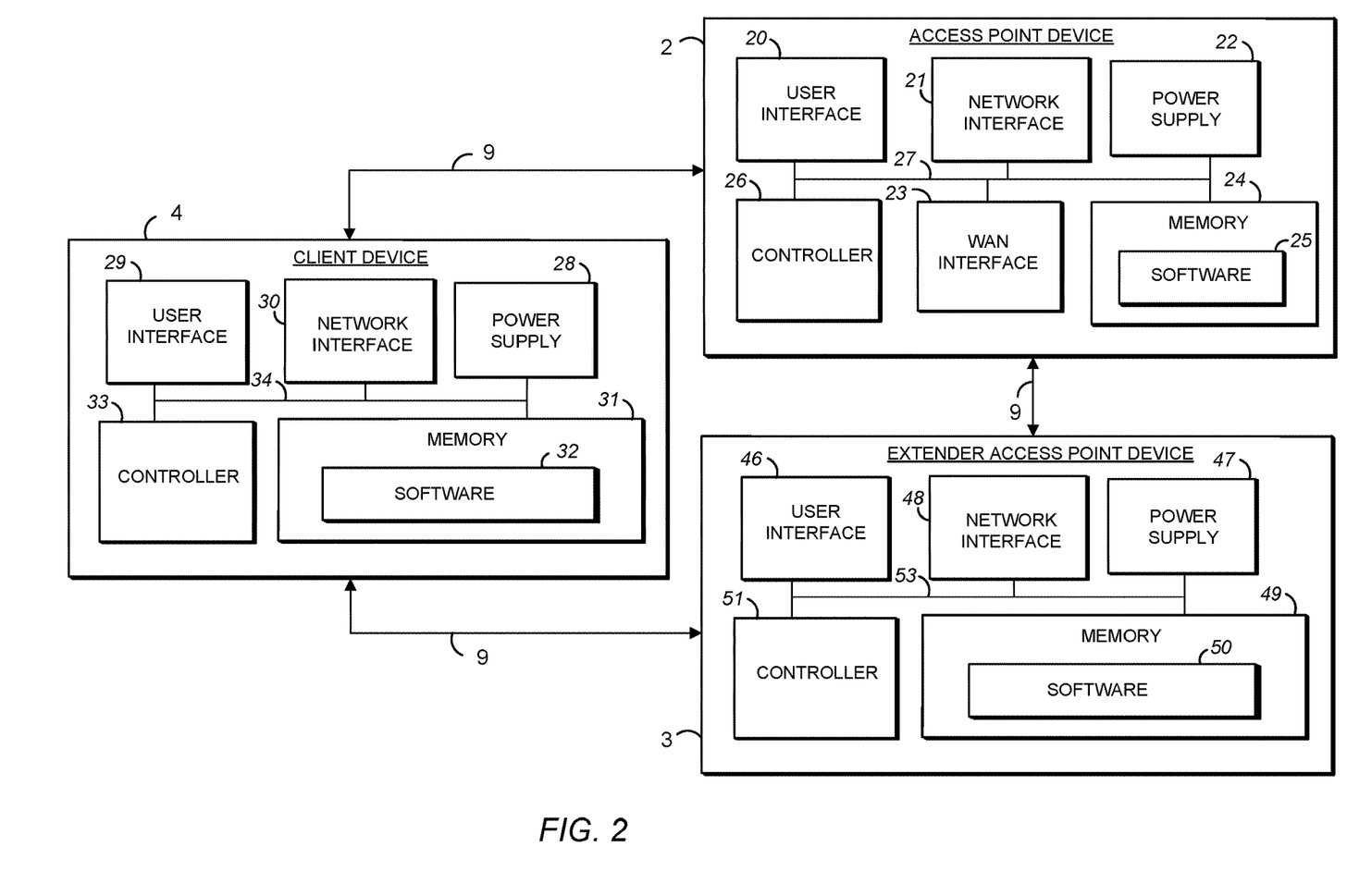
FIG. 2 is a more detailed block diagram illustrating various components of an exemplary access point device, client device, and extender access point device implemented in the network environment of FIG. 1, according to one or more aspects of the present disclosure.

A detailed description of the exemplary internal components of the access point device 2, the extender access point devices 3, and the client devices 4 shown in FIG. 1 will be provided in the discussion of FIG. 2. However, in general, it is contemplated by the present disclosure that the access point device 2, the extender access point devices 3, and the client devices 4 include electronic components or electronic computing devices operable to receive, transmit, process, store, and/or manage data and information associated with the network environment 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the access point device 2, the extender access point devices 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, and the client devices 4 are further equipped with components to facilitate communication with other computing devices or network devices over the one or more network connections to local and wide area networks, wireless and wired networks, public and private networks, and any other communication network enabling communication in the network environment 100.

FIG. 2 is a more detailed block diagram illustrating various components of an exemplary access point device, client device, and wireless extender implemented in the network environment 100 of FIG. 1, according to one or more aspects of the present disclosure.

Although FIG. 2 only shows one extender access point device 3 and one client device 4, the extender access point device 3 and the client device 4 shown in the figure are meant to be representative of the other extender access point devices 3 and client devices 4 of a network system, for example, network environment 100 shown in FIG. 1. Similarly, the connections 9 between the access point device 2, the extender access point device 3, and the client device 4 shown in FIG. 2 are meant to be exemplary connections and are not meant to indicate all possible connections between the access point devices 2, extender access point devices 3, and client devices 4. Additionally, it is contemplated by the present disclosure that the number of access point devices 2, extender access point devices 3, and client devices 4 is not limited to the number of access point devices 2, extender access point devices 3, and client devices 4 shown in FIGS. 1 and 2.

The client device 4 can be, for example, a computer, a portable device, an electronic tablet, an e-reader, a PDA, a mobile phone such as a smart phone, a smart speaker, an IoT device, an iControl device, portable music player with smart capabilities capable of connecting to the Internet, cellular networks, interconnecting with other devices via Wi-Fi and Bluetooth, or other wireless hand-held consumer electronic device capable of communicating with access point device 2, a network resource 6 or any other network device. In one or more embodiments, a client device 4 is a mobile network device, such as a smart phone, capable of provisioning an access point device 2 such that the access point device 2 can provide a 6 GHz wireless frequency band network. The client device 4 can communicate with one or more resources 6 to obtain the necessary information for provisioning of the access point device 2, according to one or more aspects of the present disclosure.

The client device 4 includes a power supply 28, a user interface 29, a network interface 30, a memory 31, and a controller 33.

The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

Figure 4:
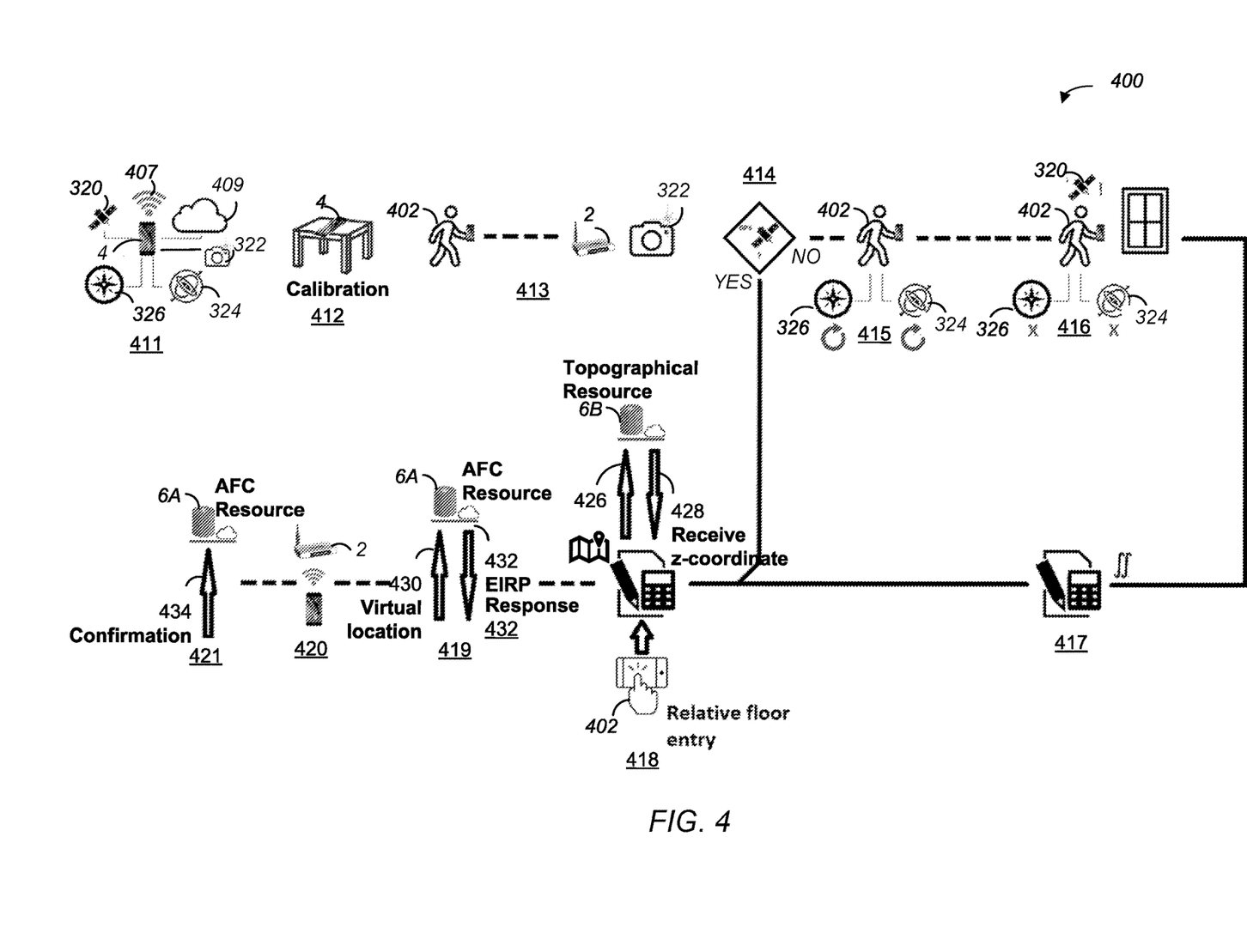
FIG. 4 is an illustration of provisioning an access point device in a network environment, according to one or more aspects of the present disclosure.

The user interface 29 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the client device 4, for example, for a user to enter any one or more parameters that can be stored in memory 31, such as a height location 316 of an access point device 2 as discussed with reference to FIG. 4. In one or more embodiments, user interface 29 provides an interface for a user, such as a graphical user interface, to interact with a provisioning application, for example, software 32, to provision or commission an access point device 2 to provide a 6 GHz wireless frequency band network. The network interface 30 can include, but is not limited to, various network cards, interfaces, and circuitry implemented in software and/or hardware to enable communications with the access point device 2, the extender access point device 3, ISP 1, and/or network resource 6 using any one or more of the communication protocols in accordance with connection 9 (e.g., as described with reference to FIG. 1).

The memory 31 includes a single memory, one or more memories, or one or more memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for controlling the general function and operations of the client device 4 in accordance with the embodiments described in the present disclosure. In one or more embodiments, software 32 can be a provisioning application. Memory 31 can store the provisioning application and information used by the provisioning application to provision an access point device 2 to utilize the 6 GHz wireless frequency band. In one or more embodiments, client device 4 is a network device, such as a mobile or smart phone, and provisioning application includes one or more instructions for establishing a connection with the access point device 2 so that the provisioning application can perform any of determine a location associated with the access point device 2, receive an asset, such as information from a network resource 6, determine a signal strength associated with the access point device 2, obtain any other information, make any other determination associated with provisioning the access point device 2, provision the access point device 2, or any combination thereof. An asset can include any of data or information associated with provisioning the access point device 2, for example, any of topographical data, EIRP data, an EIRP mask, any other coordinate information, or a combination thereof.

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure, such as provisioning access point device 2. Communication between the components (e.g., 28-31 and 33) of the client device 4 may be established using an internal bus 34.

The extender access point device 3 can be, for example, any wireless hardware electronic device used to extend a wireless network by receiving the signals transmitted by the access point device 2 and rebroadcasting the signals to any one or more client devices 4, which may be out of range of the access point device 2 including, but not limited to, a wireless extender, a repeater, and/or an access point. The extender access point device 3 can also receive signals from any one or more of the client devices 4 and rebroadcast the signals to the access point device 2 or any other one or more client devices 4.

As shown in FIG. 2, the extender access point device 3 includes a user interface 46, a power supply 47, a network interface 48, a memory 49, and a controller 51.

The user interface 46 can include, but is not limited to, one or more push buttons, a keyboard, a keypad, an LCD, a TFT, an LED, an HD or other similar display device including a display device having touch screen capabilities so as to allow interaction between a user and the extender access point device 3.

The power supply 47 supplies power to the internal components of the wireless extender access point device 3 through the internal bus 53. The power supply 47 can be connected to an electrical outlet (e.g., either directly or indirectly by way of another device) via a cable or wire.

The network interface 48 can include various network cards, interfaces, and circuitry implemented in software and/or hardware to enable communications with the client device 4 and the access point device 2 using the communication protocols in accordance with connection 9 (e.g., as described with reference to FIG. 1). For example, the network interface 48 can include multiple radios or sets of radios (e.g., a 2.4 GHz radio, one or more 5 GHz radios, and/or a 6 GHz radio), which may also be referred to as wireless local area network (WLAN) interfaces. One radio or set of radios (e.g., 5 GHz and/or 6 GHz radio(s)) provides a backhaul connection between the wireless extender access point device 3 and the access point device 2, and optionally other wireless extender access point device(s) 3. Another radio or set of radios (e.g., 2.4 GHz, 5 GHz, and/or 6 GHz radio(s)) provides a fronthaul connection between the extender access point device 3 and one or more client device(s) 4.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the wireless extender access point device 3 in accordance with the embodiments described in the present disclosure. In one or more embodiments, extender access point device 3 is a network device and software 50 includes one or more instructions for establishing a connection with the access point device 2 and/or a client device 4.

The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a digital signal processor (DSP), or other similar processing device capable of executing any type of instructions, algorithms, or software for controlling the operation and functions of the wireless extender access point device 3 in accordance with the embodiments described in the present disclosure. General communication between the components (e.g., 46-51) of the extender access point device 3 may be established using the internal bus 53.

The access point device 2 can be, for example, a hardware electronic device that can combine one or more functions of any of a modem, a gateway, an access point (AP), a router, or combinations thereof for providing content received from the content provider (ISP) 1 to network or wireless devices (e.g., extender access point devices 3, client devices 4) in the system. It is also contemplated by the present disclosure that the access point device 2 can include the function of, but is not limited to, an IP/QAM STB, a media decoder, or any other decoder that is capable of decoding audio/video content, and playing OTT or MSO provided content.

As shown in FIG. 2, the access point device 2 includes a user interface 20, a network interface 21, a power supply 22, a wide area network (WAN) interface 23, a memory 24, and a controller 26.

The user interface 20 can include, but is not limited to, one or more push buttons, a keyboard, a keypad, an LCD, a TFT, an LED, an HD or other similar display device including a display device having touch screen capabilities so as to allow interaction between a user and the access point device 2. In one or more embodiments, the user interface 20 provides an interface, such as a command-line interface, a graphical user interface, an interface output port for connection to a display, and/or any other type of user interface. In one or more embodiments, access point device 2 communicates with a client device 4 to provide information associated with the access point device 2 such that the client device 4 can obtain an EIRP mask so as to provision the access point device 2, according to one or more aspects of the present disclosure.

The network interface 21 may include various network cards, and circuitry implemented in software and/or hardware to enable communications with the extender access point device 3 and the client device 4 using the communication protocols in accordance with connection 9 (e.g., as described with reference to FIG. 1). Additionally, the various network cards, interfaces, and circuitry of the network interface 21 enable communications with a client device 4 (e.g., a mobile device) using the one or more communication protocols in accordance with connection 10 (e.g., as described with reference to FIG. 1). For example, the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) provides a backhaul connection between the access point device 2 and the wireless extender access point device(s) 3. Another radio or set of radios (e.g., 2.4 GHz, 5 GHz, and/or 6 GHz radio(s)) provides a fronthaul connection between the access point device 2 and one or more client device(s) 4. In one or more embodiments, the network interface 21 interfaces with a network resource 6.

The power supply 22 supplies power to the internal components of the access point device 2 through the internal bus 27. The power supply 22 can be connected to an electrical outlet (e.g., either directly or by way of another device) via a cable or wire.

The wide area network (WAN) interface 23 may include various network cards, and circuitry implemented in software and/or hardware to enable communications between the access point device 2 and the ISP 1 using the wired and/or wireless protocols in accordance with connection 13 (e.g., as described with reference to FIG. 1).

The memory 24 includes a single memory, one or more memories, or one or more memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be a non-transitory computer-readable storage medium used to store any type of instructions, software, or algorithm including software 25 for providing a 6 GHz wireless frequency network based on provisioning by a client device 4.

The controller 26 controls the general operations of the access point device 2 as well as connectivity to the network by one or more other network devices (wireless extender access point devices 3 and client device 4). The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the software 25 in accordance with the embodiments described in the present disclosure. Communication between the components (e.g., 20-24, and 26) of the access point device 2 may be established using the internal bus 27. The controller 26 may also be referred to as a processor, generally.

Figure 3:
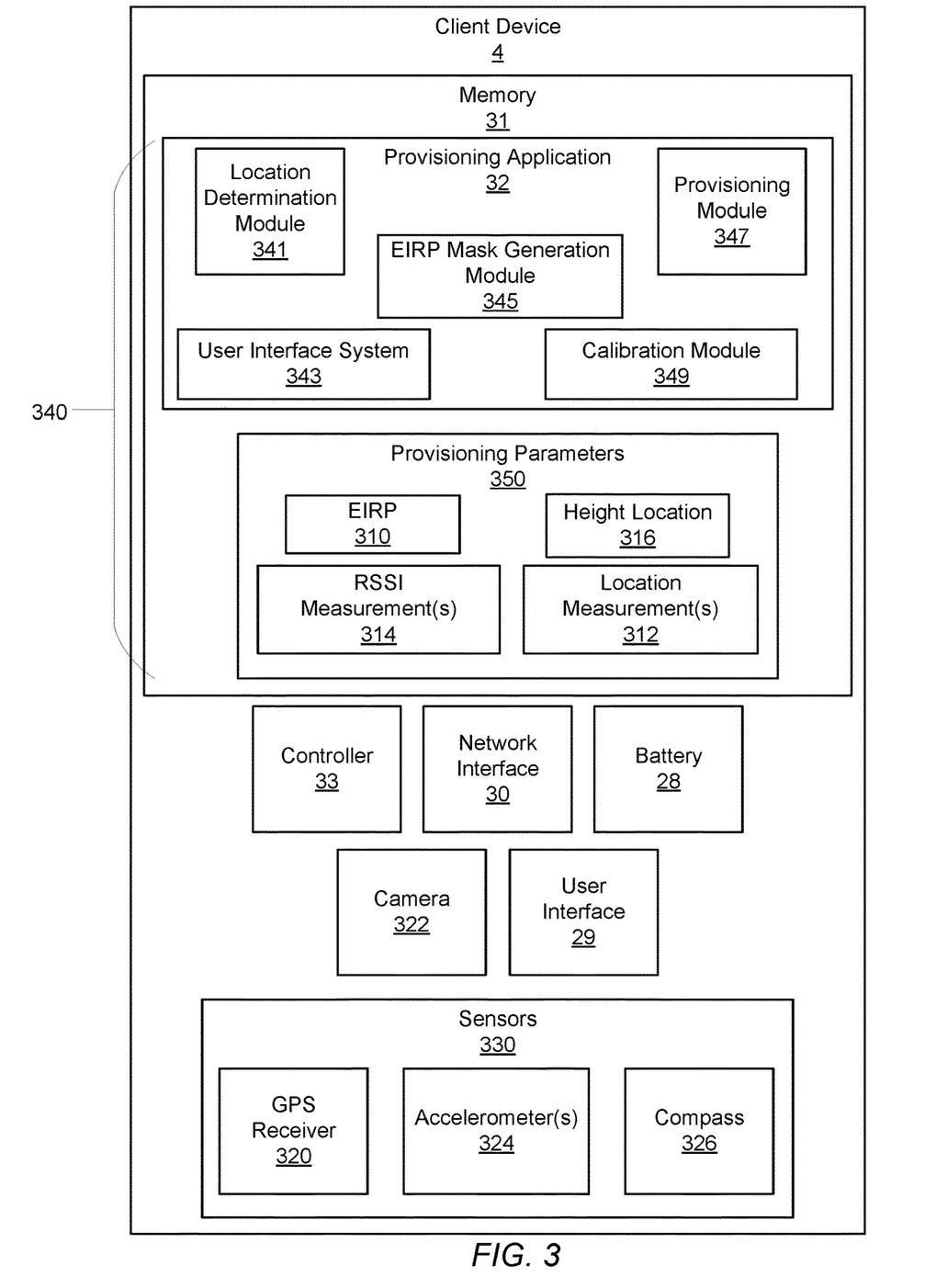
FIG. 3 is a more detailed block diagram illustrating a client device for use in obtaining location information of an access point device of a network environment, according to one or more aspects of the present disclosure.

FIG. 3 is a more detailed block diagram illustrating certain components of an exemplary client device 4 implemented in the network environment of FIG. 1 and in FIG. 2, according to one or more aspects of the present disclosure.

As shown in FIG. 3, the client device 4 includes a memory 31, a controller 33, a network interface 30, a power supply 28 (such as a rechargeable battery), a user interface 29, a camera 322 or any other device for receiving/recording a visual image, and one or more sensors 330. The one or more sensors 330 can include a global positioning system (GPS) receiver 320, one or more accelerometers 324, a compass or magnetometer 326, any other sensor, or any combination thereof. In one or more embodiments, any of the one or more sensors 330 can be part of a single device or one or more devices. The memory 31 can be a computer-readable memory for storing software or one or more computer-readable instructions executable by the controller 33, for example, a provisioning system 340 that includes a provisioning application 32 and one or more provisioning parameters 350 for use by the provisioning application 32, for example, any one or more measurements or data received from any of the one or more sensors 330. The provisioning application 32 can include one or more modules or systems, such as a location determination module 341, a user interface system 343, an EIRP mask generation module 345, a provisioning module 347, and a calibration module 349. Any one or more of the components of the provisioning application 32 can be implemented by software, hardware, or a combination thereof. In one or more embodiments, any one or more components of provisioning application 32 are included within single component or multiple components.

The one or more provisioning parameters 350 can include an EIRP 310 associated with the access point device 2, one or more location measurements 312, a height location 316, and one or more received signal strength indicator (RSSI) measurements 314. The EIRP 310 is associated with a wireless frequency band and channel of the access point device 2 that the client device 4 utilizes to connect to the access point device 2. The one or more location measurements 312 are measurements associated with the location of the access point device 2. For example, the one or more location measurements 312 can comprise three or more measurements at three or more locations indicative of the location of the access point device 2, such as three or more x-y coordinate pairs. The one or more location measurements 312 can be determined or obtained based on information received from the GPS receiver 320. For example, the provisioning application 32 can receive from a GPS receiver 320 one or more coordinates associated with a current position of the client device 4 and store the one or more coordinates as a location measurement 312. Each of the one or more location measurements 312 can have an associated one or more RSSI measurements 314. That is, for each location at which a location measurement 312 is received, an associated RSSI measurement 314 can be obtained. For example, client device 4 can include as part of the operating system and/or as a utility application an interface to obtain an RSSI measurement 314 associated with the access point device 2. The height location 316 is indicative of a height location of the access point device 2.

In one or more embodiments, the user interface 29 includes a display and a graphical user interface or any other type of user interface. The provisioning application 32 can send one or more prompts to the user interface 29 that request information from or provide information to a user of the client device 4. For example, the user interface 29 can display a prompt to the user for information associated with a height location 316 of the access point device 2, one or more instructions to transition the client device 4 to one or more locations about a network environment or site, such as network environment 400, verification of one or more locations, including virtual locations, determined, received, or obtained, any other information or request for information associated with the provisioning application 32, or any combination thereof.

FIG. 4 is an illustration of provisioning an access point device 2 at a site or a network environment 400, according to one or more aspects of the present disclosure. Prior to an access point device 2 receiving an EIRP mask, the access point device 2 can establish a connection to one or more network devices, for example, client device 4, via a low power indoor (LPI) EIRP on a 6 GHz Wi-Fi without any AFC restriction. The AFC provisioning provides access to standard power (SP) levels for enhanced Wi-Fi coverage. Prior to the AFC provisioning of the access point device 2, the three-dimensional (3-D) coordinate location of the access point device 2 is obtained so as to determine if any interference potential exists between the access point device 2 and any other systems or devices within proximity, for example, any fixed microwave systems that use the same channels. Generally, location can be determined based on a GPS coordinate. However, the z-coordinate from a GPS is typically three times less accurate than the x-coordinate and the y-coordinate. Legacy systems, such as microwave systems, have an aperture associated with operation and many of these legacy systems are tower mounted making the 3-D coordinate location of the access point device 2 important for an accurate determination of any interference. For the access point device 2 to operate within the 6 GHz wireless frequency band without causing any interference with these legacy systems or devices, a virtual location is determined that includes or accounts for the height or z-coordinate of the access point device 2.

At aspect 411, the client device 4 capabilities are acknowledged. The client device 4, for example, must be capable of receiving a GPS signal (for example, via a GPS receiver 320) and a Wi-Fi signal (for example, via a wireless network 407), receiving one or more measurements via one or more sensors (such as from one or more accelerometers 324 and a compass 326) and determining or measuring an RSSI associated with the access point device 2. In one or more embodiments, the client device 4 can utilize a cellular signal. In one or more embodiments, the client device 4 is a mobile device, such as a mobile or smart phone. A user 402 can launch the provisioning application 32 that enables the compass 326, the one or more accelerometers 324, the Wi-Fi connection to the wireless network 407, the GPS receiver 320, and a camera 322.

At aspect 412, the client device 4 can be placed on a flat surface to calibrate the one or more sensors 330. For example, the provisioning application 32 can instruct the user to place the client device 4 on a table or other flat surface and provide a rotational display target to align the client device 4 with magnetic North. The calibration, for example, can provide bias value assignments of the compass 326 and the one or more accelerometers 324. In one or more embodiments, the calibration is performed by a calibration module 349 of the provisioning application 32.

At aspect 413, the provisioning application 32 can instruct the user 402 to transition the client device 4 from the aspect 412 (or the flat surface) to the access point device 2. The user 402 can then be instructed to utilize the camera 322 to capture a target frame-filled image of the access point device 2. The image can be used to verify the type of access point device 2 and/or for validation of the access point device 2 by an authorization entity, for example, the AFC resource 6A.

At aspect 414, the client device 4 is transitioned to within a proximity of the access point device 2, for example, at or about one meter or less. The provisioning application 32 can query the GPS receiver 320 for a GPS fix. If a GPS fix is not obtained or not available, the user at aspect 415 can be prompted by the provisioning application 32 to transition the client device 4 to an opening, such as a window, a door, or any other opening to an unobstructed area where the GPS receiver 320 can obtain a location fix. For example, at aspect 416 the user 402 transitions the client device 4 to a window to obtain the GPS fix via a GPS receiver 320 of the client device 4. In one or more embodiments, the user 402 is prompted to transition the client device 4 until a GPS fix can be obtained. The transitioning of the client device 4 to obtain the GPS fix can be referred to as pedestrian dead reckoning (PDR). During the PDR, the provisioning application can periodically or continuously sample the compass or magnetometer 326 and the accelerometer 324 (as indicated by the refresh symbol) to obtain sensor data (such as a four-tuple sensor data array consisting of magnetic direction data and x, y, and z accelerometer data). The sampling can continue until the GPS fix is obtained (as indicated by the "x" symbol representing that the sampling has been suspended). The GPS fix is based on the sensor data. The sensor data obtained during the sampling can be stored, for example, in memory 31. The provisioning application 32 can, once it is determined that a GPS fix has been obtained or verified, prompt the user 402 to discontinue the transitioning of the client device 4 or to halt the PDR such that the sampling is discontinued. By post-processing the data or one or more measurements received from the compass 326 and the accelerometer 324 obtained during the PDR (inertial estimation), including double integration of the x- and y-coordinates from the accelerometer 324 and the average of the direction from the compass 326, an x- and y-offset between the access point device 2 and the point where the GPS fix is obtained can be calculated. In one or more embodiments, the GPS fix, the x- and y-offset, or both can be used by the provisioning application 32 to determine or identify the location of the access point device 2 in at least the x-y plane.

At aspect 417, a compass or magnetometer declination can be determined from the GPS fix (for example, the data received via the GPS receiver 320) which can be used to normalize the track detail for True North. The sensor data, for example, the four-tuple sensor data array, can be filtered, such as by using a moving average filter. The filtered sensor data can be normalized by removing a bias offset based on a prior calibration of the client device 4, for example, the calibration at aspect 412 and GPS-based known compass or magnetometer declination. A cumulative double integration of the normalized and filtered sensor data provides an azimuth at radius offset for the access point device 2 from the GPS fix. This offset is amendable to modification of the true latitude and longitude values (such as the x-y coordinate pair) associated with the GPS fix can be utilized to determine or set the location of the access point device 2. Generally, the ambiguities associated with the double integration are cancelled as the integration(s) involve a stepwise difference calculation at each data point of the sampled data associated with the sensor data at aspect 416.

At aspect 418, to constrain the inherent error in the z-coordinate the GPS fix for a height above sea level, a virtual height for the access point device 2 is de-referenced from information received from a network resource 6. A user 402 can be prompted by the provisioning application 32 to enter a relative height or height location 316 of the access point device 2. For example, height location 316 can be based on the user 402 entering any of a height from a ground surface to the access point device 2, a floor number of the network environment or site 400 (for example, that the provisioning application 32 converts to a height measurement), any other height measurement associated with the z-coordinate of the access point device 2, or any combination thereof. A virtual location for the access point device 2 can be determined based on the GPS fix, the height location 316 (for example, the height entered by the user 402), or both. In one or more embodiments, the provisioning application 32 notifies the user 402 of the virtual location, prompts the user 402 to confirm the virtual location, or both.

The virtual location can be sent as a part of a location request 426 to a topographical network resource 6B, such as a United States geological survey (USGS) topographical mapping database and/or any other topographical network resource, based on the virtual location of the access point device 2. The client device 4 receives from the topographical network resource 6B a location response 428 that comprises topographical mapping location coordinates for the access point device 2. The topographical mapping location coordinates can include a topographical mapping z-coordinate that corresponds to the ground elevation sent to the topographical network resource 6B. Any one or more coordinates of the virtual location can then be updated or modified based on the topographical mapping location coordinates received as part of the location response 428. For example, the z-coordinate of the virtual location can be updated based on the terrain elevation received from the topographical network resource 6B. This updated z-coordinate indicates a height above sea level. The updated z-coordinate is then modified or scaled based on the height location 316 to determine the offset or scaled height location (such as the topographical mapping location z-coordinate plus the height location 316) of the access point device 2. This offset or scaled height location replaces the z-coordinate in the topographical mapping location z-coordinate, for example, replaces GPS z-coordinate value in the GPS positional three-tuple) to form a modified virtual location. As discussed with reference to aspect 415, if a topographical network resource 6B is not available or if a more accurate z-coordinate is not required, then the virtual location of the access point device 2 can be modified to include a z-coordinate based on any of the height location 316, any one or more location measurements 312, or any combination thereof or not modified at all.

At aspect 419, an EIRP request 430 can be sent to an AFC resource 6A. The EIRP request 430 can comprise the virtual location or the modified virtual location and the EIRP 310. The AFC resource 6A utilizes an exclusion zone calculus to resolve any potential for interference between a known legacy system or infrastructure and the access point device 2 based on the EIRP request 430. The exclusion zone calculus can comprise a two-dimensional radius check of the access point device 2 at the location provided in the EIRP request 430, a 3-D antenna radiation pattern comparison of the access point device 2 at the location provided in the EIRP request 430, any other exclusion zone calculus, or a combination thereof. The AFC resource 6A can send an EIRP response 432 that comprises an EIRP mask. The EIRP mask can include an array of maximum EIRP values per Megahertz (MHz) or channel number, where the EIRP mask is appropriate for or covers all of the 6 GHz frequency band, and/or a channel use mask.

At aspect 420, the provisioning application 32, if not already or previously connected, establishes a connection to the wireless network 407. The provisioning application 32 provisions the access point device 2 via the wireless network 407 based on the EIRP response 432, for example, the EIRP mask. In one or more embodiments, the provisioning application 32 can utilize any one or more connections to the access point device 2 for the provisioning. In one or more embodiments, the user 402 can be prompted via the user interface 29 to transition the client device 4 to within a proximity of the access point device 2 so that the connection between the access point device 2 and the client device 4 can be established. In one or more embodiments, the provisioning application 32 notifies the user 402 when the client device 4 is within a connection proximity of the access point device.

At aspect 421, the provisioning application 32 establishes a connection with an AFC resource 6A. The provisioning application 32 can supply the AFC resource 6A with a confirmation of the provisioning of the access point device 2. The confirmation can include, but is not limited to, any of the image of the access point device 2 as discussed with reference to aspect 413, the EIRP response 432, the EIRP mask, an associated location, any other parameter or information, or any combination thereof.

In one or more embodiments, the provisioning system 340 comprises the provisioning application 32. The provisioning application 32 can include a calibration module 349 that performs any one or more operations or steps discussed with reference to aspect 412. The provisioning application 32 can include a location determination module 341 that performs any one or more operations or steps discussed with reference to any one or more of aspects 413-418. The provisioning application 32 can include a user interface system 343 that performs any one or more steps discussed with reference to any one or more aspects 413-420 for prompting a user. The provisioning application 32 can include an EIRP mask generation module 345 that performs any one or more steps discussed with reference to aspect 419. The provisioning application 32 can include a provisioning module 347 performs any one or more steps discussed with reference to any one or more aspects 420-421.

Figure 5:
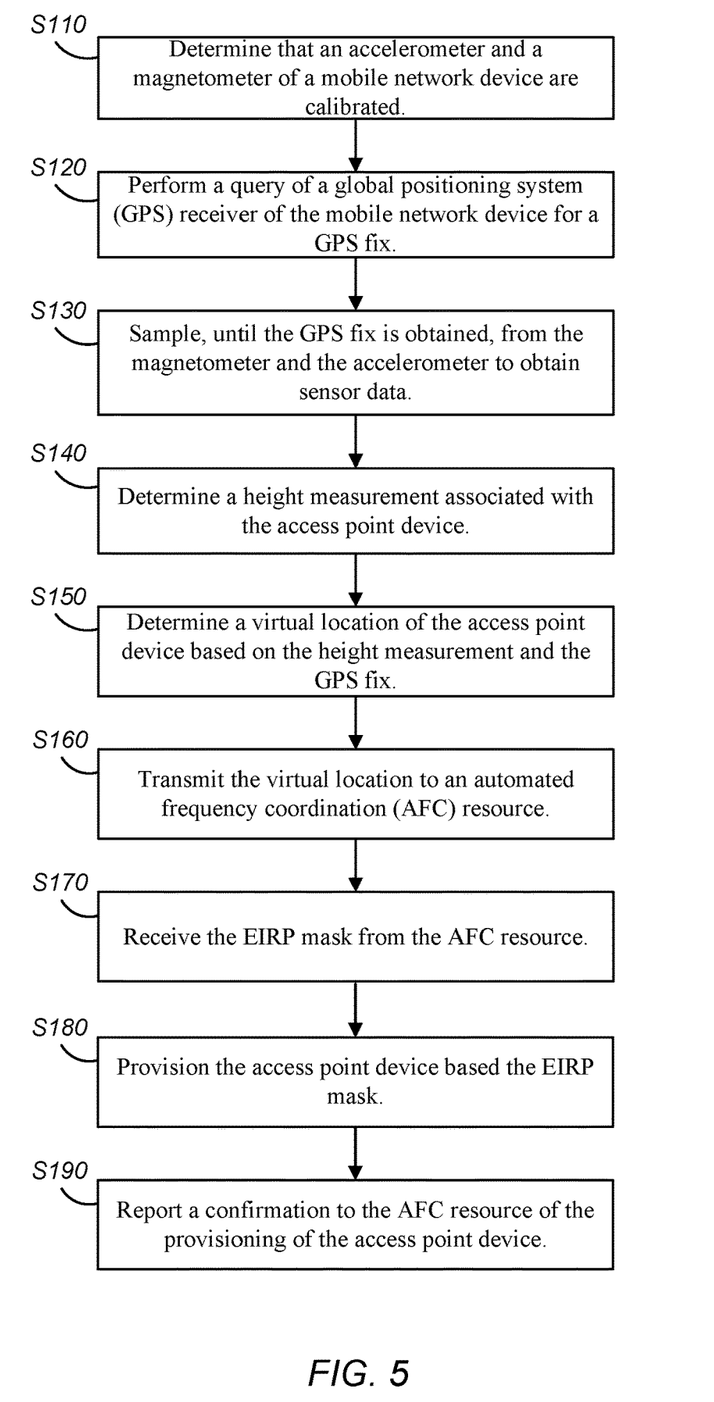
FIG. 5 is a flow chart illustrating a method for provisioning an access point device of a network environment, according to one or more aspects of the present disclosure.

FIG. 5 is a flow chart illustrating a method for provisioning an access point device, according to one or more aspects of the present disclosure.

The client device 4 may be programmed with one or more computer-readable instructions such as a provisioning application that when executed by a controller 33 cause the client device 4 to provide provisioning of an access point device 2 according to one or more embodiments so as to provide an enhanced QoE for users of a network environment by allowing for SP exploit of a 6 GHz frequency band. In FIG. 5, it is assumed that any one or more of the devices include their respective controllers and their respective software stored in their respective memories, as discussed above in connection with FIGS. 1-4, which when executed by their respective controllers perform the functions and operations in accordance with the example embodiments of the present disclosure (e.g., including performing a configuration of one or more network devices). While the steps S110-S190 are presented in a certain order, the present disclosure contemplates that any one or more steps can be performed simultaneously, substantially simultaneously, repeatedly, in any order or not at all (omitted).

At step S110, a calibration module 349 of a provisioning system 340 determines calibration of an accelerometer 324 and a magnetometer 326 associated with a mobile network device 4. In one or more embodiments, a user interface system 343 of the provisioning system 340 prompts a user to calibrate the mobile network device 4 so that the calibration can be determined.

At step S120, the location determination module 341 of the provisioning system 340 performs a query of a GPS receiver 320 of the mobile network device 4 for a GPS fix. At step S130, the location determination module 341 samples the magnetometer 326 and the accelerometer 324 to obtain sensor data until a GPS fix is obtained. In one or more embodiments, the user interface system 343 can prompt the user to transition the mobile network device 4 until the GPS fix is obtained and then notifies the user once the GPS fix is obtained. The sensor data comprises a magnetic direction associated with each sampling of the magnetometer 326 and a plurality of coordinates for each sampling of the accelerometer 324. In one or more embodiments, the location determination module 341 can determine a magnetometer declination associated with the magnetometer 326 and normalize the sensor data based on the magnetometer declination. In one or more embodiments, the location determination module 341 can perform a double integration of the normalized sensor data such that the offset is based on the double integration. The location determination module 341 can determine an azimuth at radius offset for the success point device 2 based on the double integrations and modify the virtual location based on the azimuth at radius offset. At step S140, the location determination module 341 determines a height measurement associated with the access point device 2 that is to be provisioned. At step S150, the location determination module 341 determines a virtual location of the access point device 2 based on the height measurement and the GPS fix. In one or more embodiments, the location determination module 341 transmits the virtual location to a topographical resource 6B and receives from the topographical resource 6B a z-coordinate. The location determination module 341 can modify the virtual location based on the received z-coordinate from the topographical resource 6B. In one or more embodiments, the user interface system 343 prompts the user to confirm the virtual location of the access point device 2.

At step S160, the EIRP mask generation module of the provisioning system 340 transmits the virtual location to an AFC resource 6A. At step S170, the EIRP mask from the AFC resource 6A. In one or more embodiments, the virtual location is the modified virtual location.

At step S180, the provisioning module 347 of the provisioning system 340 provisions the access point device 2 based on the EIRP mask. At S190, the provisioning module 347 reports a confirmation to the AFC resource 6A of the provisioning of the access point device 2. The report can include an image of the access point device 2, the EIRP mask, the virtual location or modified virtual location, or any combination thereof.

According to one or more example embodiments of inventive concepts disclosed herein, there are provided novel solutions for provisioning an access point device 4 so that a network environment can utilize a 6 GHz frequency band which can provide an enhanced QoE for a user.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for provisioning an access point device of a network using an equivalent isotropically radiated power (EIRP) mask comprising:
   determining that an accelerometer and a magnetometer of a mobile network device are calibrated;
   performing a query of a global positioning system (GPS) receiver of the mobile network device for a GPS fix;
   sampling, until the GPS fix is obtained, from the magnetometer and the accelerometer to obtain sensor data, wherein the sensor data comprises a magnetic direction associated with each sampling of the magnetometer and a plurality of coordinates for each sampling of the accelerometer, wherein the GPS fix is based the sensor data;
   determining a height measurement associated with the access point device;
   determining a virtual location of the access point device based on the height measurement and the GPS fix;
   transmitting the virtual location to an automated frequency coordination (AFC) resource;
   receiving the EIRP mask from the AFC resource; and
   provisioning the access point device based the EIRP mask.

2. The method of claim 1, further comprising:
   determining a magnetometer declination associated with the magnetometer; and
   normalizing the sensor data based on the magnetometer declination.

3. The method of claim 2, further comprising:
   performing a double integration of the normalized sensor data;
   determining an azimuth at radius offset for the access point device based on the double integration; and
   modifying the virtual location based on the azimuth at radius offset.

4. The method of claim 1, further comprising:
   transmitting the virtual location to a topographical resource;
   receiving from the topographical resource a z-coordinate; and
   modifying the virtual location based on the z-coordinate, wherein the virtual location transmitted to the AFC resource is the modified virtual location.

5. The method of claim 1, further comprising:
   prompting a user to calibrate the mobile network device; and
   prompting the user to transition the mobile network device until the GPS fix is obtained.

6. The method of claim 1, further comprising:
   prompting a user to confirm the virtual location of the access point device.

7. The method of claim 1, further comprising:
   reporting a confirmation to the AFC system of the provisioning of the access point device.

8. A client device for provisioning an access point device of a network using an equivalent isotropically radiated (EIRP) mask comprising:
   a memory storing one or more computer-readable instructions;
   a processor configured to execute the one or more computer-readable instructions to:
      determine a calibration of an accelerometer and a magnetometer associated with a mobile network device; and
      perform a query of a global positioning system (GPS) receiver of the mobile network device for a GPS fix;
      sample, until the GPS fix is obtained, the magnetometer and the accelerometer to obtain sensor data, wherein the sensor data comprises a magnetic direction associated with each sampling of the magnetometer and a plurality of coordinates for each sampling of the accelerometer;
      determine a height measurement associated with the access point device; and
      determine a virtual location of the access point device based on the height measurement and the GPS fix;
      transmit the virtual location to an automated frequency coordination (AFC) resource;
      receive the EIRP mask from the AFC resource; and
      provision the access point device based on the EIRP mask.

9. The client device of claim 8, wherein the processor is further configured to execute the one or more computer-readable instructions to:
   determine a magnetometer declination associated with the magnetometer; and
   normalize the sensor data based on the magnetometer declination.

10. The client device of claim 9, wherein the processor is further configured to execute the one or more computer-readable instructions to:
    perform a double integration of the normalized sensor data, wherein the offset is based on the double integration;
    determine an azimuth at radius offset for the access point device based on the double integration; and
    modify the virtual location based on the azimuth at radius offset.

11. The client device of claim 8, wherein the processor is further configured to execute the one or more computer-readable instructions to:
    transmit the virtual location to a topographical resource;
    receive from the topographical resource a z-coordinate; and
    modify the virtual location based on the z-coordinate, wherein the virtual location transmitted to the AFC resource is the modified virtual location.

12. The client device of claim 8, wherein the processor is further configured to execute the one or more computer-readable instructions to:
    prompt a user to calibrate the mobile network device; and
    prompt the user to transition the mobile network device until the GPS fix is obtained.

13. The client device of claim 8, wherein the processor is further configured to execute the one or more computer-readable instructions to:
    prompt a user to confirm the virtual location of the access point device.

14. The client device of claim 8, wherein the processor is further configured to execute the one or more computer-readable instructions to:
   report a confirmation to the AFC resource of the provisioning of the access point device.

15. A non-transitory computer-readable medium for storing one or more instructions for provisioning an access point device using an EIRP mask, that when executed by a processor, cause the processor to perform one or more operations comprising:
   determining that an accelerometer and a magnetometer of a mobile network device are calibrated;
   performing a query of a global positioning system (GPS) receiver of the mobile network device for a GPS fix;
   sampling, until the GPS fix is obtained, from the magnetometer and the accelerometer to obtain sensor data, wherein the sensor data comprises a magnetic direction associated with each sampling of the magnetometer and a plurality of coordinates for each sampling of the accelerometer;
   determining a height measurement associated with the access point device;
   determining a virtual location of the access point device based on the height measurement and the GPS fix;
   transmitting the virtual location to an automated frequency coordination (AFC) resource;
   receiving the EIRP mask from the AFC resource; and
   provisioning the access point device based on the EIRP mask.

16. The non-transitory computer-readable medium of claim 15, wherein the one or more instructions when executed by the processor, further cause the processor to perform the one or more operation further comprising:
   determining a magnetometer declination associated with the magnetometer; and
   normalizing the sensor data based on the magnetometer declination.

17. The non-transitory computer-readable medium of claim 16, wherein the one or more instructions when executed by the processor, further cause the processor to perform the one or more operations further comprising:
   performing a double integration of the normalized sensor data;
   determining an azimuth at radius offset for the access point device based on the double integration; and
   modifying the virtual location based on the azimuth at radius offset.

18. The non-transitory computer-readable medium of claim 15, wherein the one or more instructions when executed by the processor, further cause the processor to perform the one or more operations further comprising:
   transmitting the virtual location to a topographical resource;
   receiving from the topographical resource a z-coordinate; and
   modifying the virtual location based on the z-coordinate, wherein the virtual location transmitted to the AFC resource is the modified virtual location.

19. The non-transitory computer-readable medium of claim 16, wherein the one or more instructions when executed by the processor, further cause the processor to perform the one or more operations further comprising:
   prompting a user to at least one of:
   calibrate the mobile network device;
   transition the mobile network device until the GPS fix is obtained; and
   confirm the virtual location of the access point device.

20. The non-transitory computer-readable medium of claim 15, wherein the one or more instructions when executed by the processor, further cause the processor to perform the one or more operations further comprising:
   reporting a confirmation to the AFC resource of the provisioning of the access point device.

* * * * *